United States Patent [19]

Noyes et al.

[11] Patent Number: 4,611,851
[45] Date of Patent: Sep. 16, 1986

[54] PNEUMATIC BICYCLE SADDLE

[75] Inventors: Howard B. Noyes, Harvard; Rene Aelion, Concord, both of Mass.

[73] Assignee: Tecseat Ltd., Boston, Mass.

[21] Appl. No.: 807,778

[22] Filed: Dec. 11, 1985

Related U.S. Application Data

[63] Continuation of Ser. No. 312,248, Oct. 19, 1981.

[51] Int. Cl.⁴ .............................................. B62J 1/26
[52] U.S. Cl. ............................. 297/199; 297/DIG. 3
[58] Field of Search ......... 297/195, 199, 200, DIG. 3; 5/449

[56] References Cited

U.S. PATENT DOCUMENTS

| | | | |
|---|---|---|---|
| 600,799 | 3/1898 | Pillatt | 297/199 |
| 1,678,972 | 7/1928 | Bronberger | 297/199 X |
| 2,173,224 | 9/1939 | Bergwall | 297/199 |
| 3,170,172 | 2/1965 | Kessman | 5/449 X |
| 3,758,153 | 9/1973 | Bonikowsky | 297/199 |
| 4,098,537 | 7/1978 | Jacobs | 297/195 |
| 4,363,516 | 12/1982 | Braly et al. | 297/195 |

FOREIGN PATENT DOCUMENTS

| | | | |
|---|---|---|---|
| 48124 | 12/1953 | Denmark | 297/199 |
| 7511286 | 7/1975 | France | 297/199 |
| 2445263 | 7/1980 | France | 297/199 |
| 425245 | 9/1947 | Italy | 297/199 |
| 564450 | 7/1975 | Switzerland | 297/195 |
| 18166 | 8/1896 | United Kingdom | 297/199 |

Primary Examiner—Peter A. Aschenbrenner
Attorney, Agent, or Firm—Weingarten, Schurgin, Gagnebin & Hayes

[57] ABSTRACT

A molded, lightweight pneumatic bicycle saddle. The saddle is molded entirely of plastic and includes a relatively rigid lower wall providing structural support and strength to the saddle and a flexible upper wall providing comfort to the rider. The lower wall may also include a plurality of ridges angularly disposed with respect to one another to provide additional strength thereto. A valve is provided for inflation of the saddle. The bicycle of this invention is molded in a low pressure process such as rotocasting or reaction injection molding. In the rotocasting method, the same material is used for both walls but the upper wall is provided with a lesser thickness than the lower wall. In the reaction injection molding technique, the differences in rigidity are provided by forming each wall of a different material having the desired flexibility. In the rotocasting technique, the thickness of the upper wall may be varied from point to point to offer a greater degree of flexibility at some points and a greater degree of rigidity at other points to customize the seat to the needs of a particular rider. Connectors, such as sockets, are molded into the lower wall for insertion of a metal support bar for attachment to a standard bicycle seat support.

5 Claims, 7 Drawing Figures

PNEUMATIC BICYCLE SADDLE

This application is a continuation of application Ser. No. 312,248, filed Oct. 19, 1981.

FIELD OF THE INVENTION

This invention relates generally to vehicle saddles and more particularly, concerns a molded, pneumatic bicycle saddle.

BACKGROUND OF THE INVENTION

Most conventional bicycle saddles provide a low degree of comfort, especially for the novice or occasional bicycle rider who assumes an upright position. These conventional bicycle saddles generally are rigid in order to provide the necessary support, and are narrowed towards the front, to accommodate the upward and downward pumping action of the legs and to minimize friction between the legs and saddle, producing a hard, narrow ridge upon which a portion of the rider's weight usually rests. Saddles designed for racing or touring are particularly hard and narrow. Although these saddles typically are used in conjunction with drop handle bars in which the weight of the cyclist is shifted toward, much of the weight of the cyclist still rests on the saddle, and most of this weight is on the hard, narrow forward portion of the saddle. Soreness often results, especially for the novice bicyclist and even for the experienced bicyclist after long periods of riding. This soreness is often aggravated by poor road maintenance, the nearly vertical orientation of the saddle post and rough condition on cobbled or brick roads.

Nonracing bicycles are often provided with wide, soft saddles having coil springs. These saddles are comfortable for novices and for short journeys, but because these saddles require that the rider be in an upright position, because of the greater weight of the saddle, and because of the width of the saddle which causes painful friction with the thighs, such saddles are unsuitable for racing conditions and for long journeys. Much of the support is provided by the edges and the forward, narrower portion of the seat where the cushioning effect of the springs is least. Springs of these saddles are prone to corrosion which is enhanced by the water-absorbing nature of the upholstery. Most bicycle saddles currently available for the general public are a compromise between the hard racing saddles and the wider spring cushion saddles previously described and have many of the problems associated with each.

Pneumatic bicycle saddles although widely known, are not commonly used, because current pneumatic designs generally are incapable of providing both the degree of comfort desired and the rigidity necessary to support the cyclist in a racing configuration. Some known bicycle saddles have inflatable bladders, such as those disclosed in U.S. Pat. Nos. 542,613; 579,900; 626,644; 718,850; and 750,571. None of these bicycle saddles is suitable for racing vehicles, because each requires a lower support member against which the cyclist's legs may chafe and because the saddle is much larger, wider and heavier than is desired. In addition, the bladder is often subject to leakage or breakage. A two-piece molded vehicle saddle having a foam cushion, is described in U.S. Pat. No. 3,758,153. However, this saddle is not satisfactory for bicycle racing purposes because of its size. French Patent Nos. 76 21551 and 75 11286 each disclose a pneumatic saddle. However, French Patent No. 75 11286 is not sufficiently rigid to provide support for the average rider, and French Patent No. 76 21551 requires the use of a metal plate for support which potentially produces chafing and discomfort to the cyclist, and is too heavy for racing and touring.

While low pressure molding techniques are known for forming hollow articles, such as taught by U.S. Pat. No. 3,117,172, these techniques have not hitherto been successfully applied to the formation of pneumatic bicycle saddles.

SUMMARY OF THE INVENTION

Broadly speaking, this invention concerns an inexpensive, lightweight, molded pneumatic vehicle saddle especially suited for bicycles and which is sufficiently rigid to support the average rider, but which has sufficient flexibility to provide the required degree of comfort. In addition, the saddle of this invention is of suitable size and design to reduce chafing and can be configured to be acceptable even to the most avid racer of bicycles.

More particularly, the saddle of this invention includes a relatively rigid lower wall which provides the necessary support and a relatively flexible upper wall which provides the desired degree of comfort to the rider. The saddle may have a racing configuration, and still be comfortable to the rider, even in the narrow, forward portion. A valve is provided for the application of a gas to the saddle for inflation thereof.

The saddle may be formed either by a low pressure molding process such as rotocasting or reaction injection molding. In the seat formed by rotocasting, the upper and lower walls are formed of the same material, but the lower wall is provided with a greater thickness than the upper wall. In the reaction injection molded embodiment, the upper wall is formed with a relatively flexible material while the lower wall is formed of a different, more rigid material.

In either embodiment, connectors, such as sockets are molded into the lower wall for insertion of a support bar adapted to be affixed to a standard saddle support. The rotocasted embodiment may be custom contoured, and either embodiment may be provided with a pressure indicator to permit the use of variable pressures for varying degrees of comfort.

DESCRIPTION OF THE DRAWING

The objects, advantages and features of this invention will be more clearly appreciated from the following detailed description taken in conjunction with the accompanying drawing in which.

DETAILED DESCRIPTION OF THE PREFERRED EMBODIMENT

Figure 1:
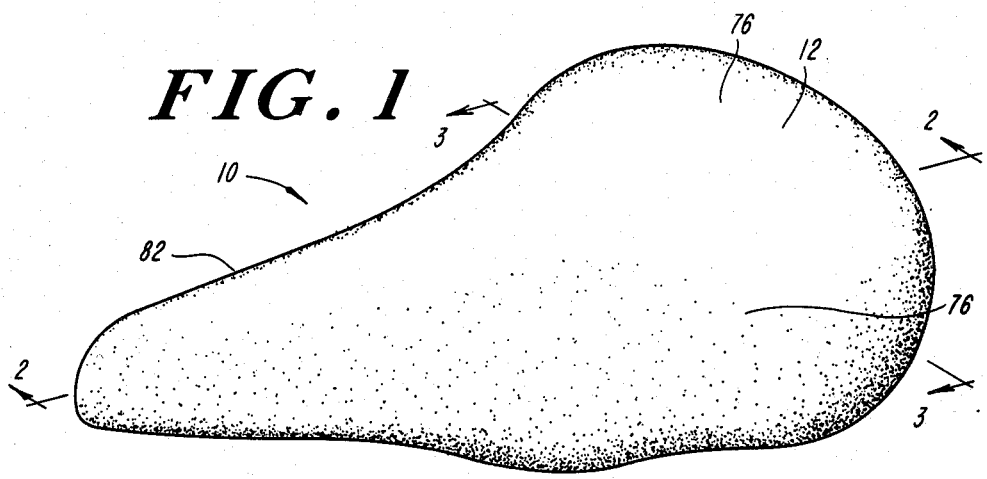
FIG. 1 is a pictorial representation of the saddle of this invention.

With reference to the drawing and more particularly to FIGS. 1 through 3 and 7, the pneumatic vehicle saddle of this invention will be described. Saddle 10 typically is a molded plastic shell filled with a pressurized gas, typically air. Saddle 10 includes an upper wall 12 and a lower wall 14 which together enclose a cavity 16. Upper wall 12 is sufficiently flexible to provide comfort to the rider, while lower wall 14 is sufficiently rigid to support the rider and saddle. A valve 18 is provided on lower wall 14 for the application of gas at the required pressure to cavity 16. Saddle 10 may have any desired shape, but typically has the shape shown in FIG. 1 which is configured for use with bicycles, and which is particularly suited for most racing applications. Lower wall 14 of saddle 10 is formed with connectors for the attachment of the saddle to a standard bicycle support. The connectors are typically a plurality of sockets 20, typically two along the rearwardly facing end 37 of the saddle and one at the forwardly facing end 39. Sockets 20 are adapted for the insertion of a support bar 22, having two rearwardly extending prongs 24 and a forwardly extending prong 26 for insertion into sockets 20. Bar 22 may be provided with a bracket 28 for mounting of the saddle to a conventional bicycle support 30 in a known manner.

Preferably, lower wall 14 is sufficiently rigid to be supported by bar 22 with a minimum of deflection when subjected to rider load, and so that the saddle does not wobble in response to up and down movement of the rider's legs while pedalling the bicycle. Upper wall 12 should be capable of flexing in response to rider pressure to provide the desired degree of comfort but it should not be so flexible as to lose its shape or as to be subject to puncture.

The strength of lower wall 14 is enhanced, for a given wall thickness and material, by the provision of a plurality of ridges molded into the wall and formed integrally therewith. These ridges typically include one longitudinal ridge 32 extending from the forwardly facing end 39 of the saddle to the rearwardly facing end 37 generally along the center thereof and a plurality, typically 4, transverse ridges 34 extending orthogonally of longitudinal ridge 32. Ridges 32 and 34 typically project outwardly from lower wall 14 only a small distance. Ridge 32 inhibits flexing of lower wall 14 about a transverse axis as a rider moves from front to back on the saddle, while transverse ridges 34 inhibit the flexing of the lower wall about a longitudinal axis and prevent the saddle from folding as a result of the downward face exerted on the sides of the saddle by the rider's overhanging legs. Although ridges 32 and 34 are not essential to the proper functioning of the bicycle seat, they permit the use of a thinner lower wall 14 which allows for a reduction in cost and weight of the saddle without affecting its strength and comfort.

A saddle having the desired degree of flexibility in upper wall 12 in combination with a lower wall 14 having the desired strength typically is formed by a low pressure molding process. In one embodiment, upper wall 12 and lower wall 14 are molded into a one-piece or unitary body. Upper wall 12 is formed of the same material as lower wall 14 but has a lesser thickness than lower wall 14. Lower wall 14 may be formed as thick as necessary to provide the desired rigidity, while the thickness of upper wall 12 may be adjusted to provide the desired degree of comfort. Subject to these limitations, the actual thickness of upper wall 12 and lower wall 14 is a function of the material used in forming the saddle and more particularly is a function of the flexular modulus of the material used. A definition of the term flexular modulus and examples thereof for certain materials are found in A.S.T.M. publication D790B. The more inflexible the material, the thinner upper wall 12 should be, and the thinner wall 14 need be. The preferred range of thicknesses for upper wall 12 takes into account the long term creep deformation, the drop weight impact and the puncture resistance of the selected material, as well as the flexular modulus. Suggested materials include thermoplastic and thermoset materials such as low density polyethylene and copolymers based on polyethylene, plasticized nylon grades, plasticized polyvinylchloride, thermoplastic elastomers such as polyester polyether block copolymers, polyester polyamides, polyether polyamides, segmented copolymers, hydrocarbon rubber modified polymers, polyurethane, ABS, and impact polystyrene. For such plastics and subject to the above constraints, the preferred range of thicknesses for upper wall 12 is between 0.02 inches and 0.2 inches. For such plastics, and subject to the above constraints, and with the provision of ridges 32 and 34, an acceptable range of thicknesses for lower wall 14 is between 0.1 inches and 0.5 inches with a preferred range of between 0.1 inches to 0.4 inches. It can be seen that in general the ratio of the thickness of upper wall 12 to lower wall 14 is in the range of between 1 over 2 to 1 over 4.

In another embodiment of this invention, a saddle having a rigid lower wall 14 and a flexible upper wall 12 may be formed by the utilization of two different materials. Typically, two different types of polyurethane having differing flexular moduli are employed. In this embodiment, the thicknesses of upper wall 12 and lower wall 14 are generally about the same, the actual thickness being strictly a function of the type of plastic used and its flexular modulus. Typically, the thickness of each wall does not exceed one-half inch.

Figure 2:
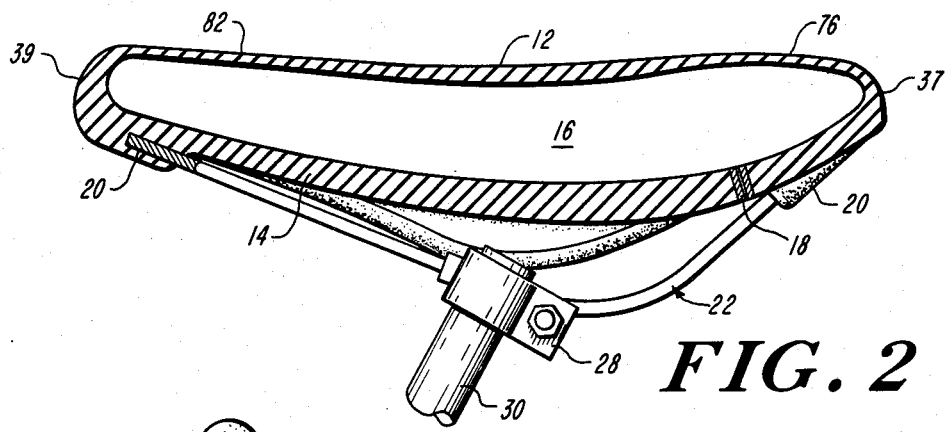
FIG. 2 is a cross-sectional side view of the saddle of FIG. 1 mounted onto a bicycle support taken along the line 2—2.
Figure 3:
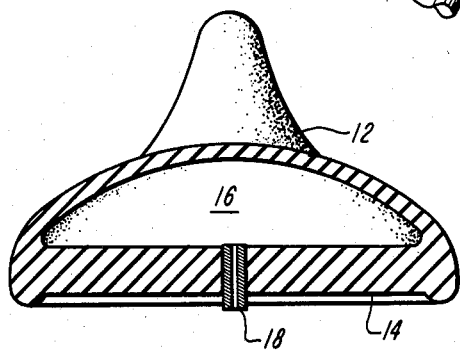
FIG. 3 is a cross-sectional view of the saddle of FIG. 1 taken along the line 3—3.
Figure 4:
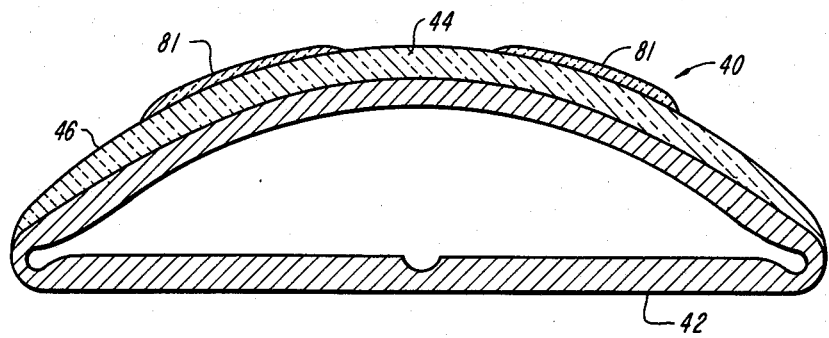
FIG. 4 is a cross-sectional view of a rotocasting mold of this invention.

Each embodiment of the saddle of this invention is formed in a low pressure molding process using a hinged, two-piece mold having the desired configuration. One half of the mold is configured to shape the upper wall, while the other half shapes the lower wall. To mold the embodiment having two differing wall thicknesses, as illustrated in FIGS. 2 and 3, a rotocasting process is used in combination with a mold typically as shown in FIG. 4. In this rotocasting process, the bottom half 42 of a two piece mold 40 is filled with a predetermined amount of the desired plastic material in powdered form, and this plastic powder is blended with additives such as U.V. stabilizers, pigments, lubricants and so forth to insure good weathering properties and the desired color. The two halves 42 and 44 of mold 40 are then clamped together and heated in a chamber of a rotocasting machine for a predetermined length of time while the mold is rotated simultaneously about two orthogonal axes. Mold 40 is subsequently cooled for curing of the finished product. The lesser thickness of the upper wall is obtained by providing a shield 46 with predetermined thickness of an insulating material on top half 44 of mold 40 so that the heat transfer is reduced from the heating chamber through the top wall of the mold. Less of the plastic powder is melted adjacent to top half 44 to form the upper wall, and greater amount of plastic powder is melted adjacent bottom half 44 of the mold to form the lower wall. The heat shield 46 may be formed of a low heat conductive metal which is electrically or chemically deposited on the outside of the mold or of asbestos or of some other insulating, non-flammable material. The difference in thickness between the upper wall and the lower wall is a function of the heat transfer coefficient of the heat shield, while the actual thickness of each wall is a function of the amount of powder used.

The following examples are provided only for the purpose of illustrating the application of the rotocasting method of forming the bicycle saddle of this invention and are intended to be non-limiting.

EXAMPLE 1

A two-piece, cast aluminum mold is utilized, and the outside of the top half 42 of the mold is provided with a 1.5 inch thick layer of asbestos insulation. The two halves of the mold are separated and loaded with 185 grams of a blend of Hytrel 5556, polyester polyether block copolymer and a small amount of pigment. The copolymer may be purchased from E. I. DuPont & Company and is in powder form, preferably 35 mesh screen. A small pneumatic valve is inserted into the bottom of the mold while loading the powder for later inflation of the saddle at a desired pressure. The two halves of the mold are then clamped together, and the mold is placed on one of the arms of a McNeil rotocasting machine. A heating chamber is set at a temperature of about 650° F. and the mold is placed therein for approximately 20 minutes. During this period of time, the mold is simultaneously rotated about 2 orthogonal axes on the arm of the rotocaster. The asbestos insulation inhibits the heat transfer along the top half of the mold, allowing less material to melt therealong. After being heated, the mold is first cooled for 4 minutes in a cooling chamber, and then is sprayed with water for 10 minutes. The total cycle consists of 34 minutes. The mold is opened and the finished saddle is removed. In this example, a saddle is formed having an upper wall thickness of 0.04 inch and a lower wall thickness of 0.12 inch.

EXAMPLE 2

A two-piece cast aluminum mold having a 1.5 inch layer of asbestos insulation on the top half is again utilized in this example as well as the McNeil rotocasting machine described in Example 1. In this example, the mold is loaded with 150 grams of a plasticized Nylon 12 powder which can be purchased from Huels under the catalogue No. L1722P. The mold is then rotated biaxially by the rotocasting machine for 20 minutes in the heating chamber at 650° F., cooled for 4 minutes in a cooling chamber and thereafter sprayed with water for 10 minutes for a total cycle of 34 minutes. In this example, the ratio of thicknesses of the bottom wall of the finished saddle to the top wall is 2.5 to 1.

EXAMPLE 3

A two-piece cast aluminum mold having a 1.5 inch layer of asbestos insulation on the top half is again utilized with a McNeil rotocasting machine. A low density polyethylene powder, which may be purchased from Union Carbide having catalogue No. 7140 is loaded into the mold. This resin has a melt index of 20. The mold is rotated biaxially within the heating chamber at a temperature of 570° F. for a period of 14 minutes, is placed in the cooling chamber for 4 minutes, and then is cooled by spraying with water for an additional 10 minutes. The resulting top wall thickness of the finished saddle is 0.075 inch while the resulting bottom wall thickness is 0.180 inch for a ratio of 1 to 2.4.

EXAMPLE 4

A two-piece cast aluminum mold having a 1.5 inch layer of asbestos insulation on the top half is again used in conjunction with a McNeil rotocasting machine. 288 grams of a black liquid plastisol, polyvinylchloride emulsion, which may be purchased from Industrial Solvents and Chemical Corporation is loaded into the mold as previously described. The mold is biaxially rotated within the heating chamber at a temperature of 550° F. for a period of 13 minutes, is cooled in the cooling chamber for 4 minutes and is sprayed with water for an additional 10 minutes in the cooling chamber. The thickness of the upper wall of the finished saddle is 0.2 inch while the lower wall thickness is 0.4 inch for a ratio of 1 to 2.

In the second embodiment of this invention in which the upper and lower walls are formed of two different materials, the saddle is typically formed by a reaction injection molding process. In this process, two different kinds of polyurethane are used. One polyurethane having a higher flexular modulus is injected into the bottom part of a two-part mold as a liquid monomer system and is cured under conventional processing conditions to form the lower wall. A chemically resistant thin film containing an air valve is placed on the inner surface of the already formed lower wall, except around the edges thereof. The upper wall of the saddle is formed by feeding into the top part of the mold a second liquid monomer system adequate for a polyurethane having a lower flexular modulus. The upper wall then bonds to the already formed lower wall at the edges thereof after polymerization and curing. The thin film prevents bonding elsewhere and the saddle may then be inflated.

Figure 5:
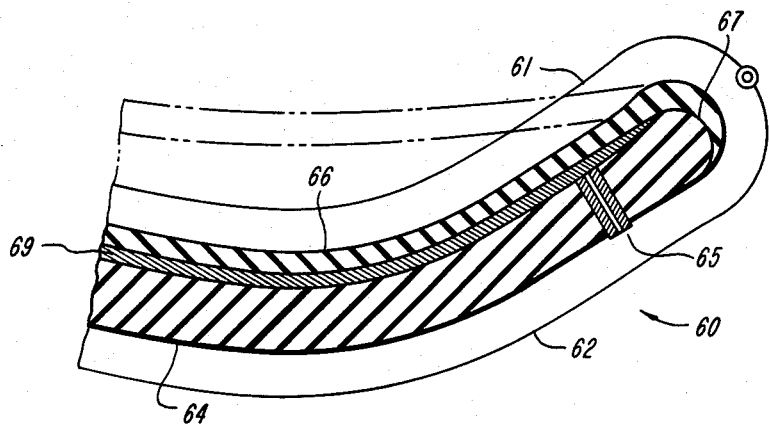
FIG. 5 is a cross-sectional view of the saddle of this invention formed by reaction injection molding.

A non-limiting, exemplary method of forming a saddle by a reaction injection molding machine is illustrated by FIG. 5 and is described below. In this process, a standard reaction injection molding machine is used having a rotary platform. A hinged mold 60 is used having a top portion 61 for forming the upper wall 66 and a bottom portion 62 for forming the lower wall 64 of a saddle. Bottom portion 62 is first fed with a rigid polyester, isocyanate monomer system which can be purchased from Uniroyal under the trademark of "Vibrathane". The material is cured in a known manner through a four minute heating cycle at 130° F. After the lower wall 64 has been formed, top portion 61 of the mold is opened and the inner surface of lower wall 64 is lined with a barrier 69 formed of a thin, chemical resistant film, such as polypropylene to prevent adhesion of the upper wall to the lower wall, except at the edges 67, during the curing process. A valve 65 is secured to barrier 69 for later inflation of the saddle. Next a flexible urethane monomer system is fed into top portion 61, partially separated from the premolded lower wall 64 by barrier 69. The mold is then closed and upper wall 66 is cured within the mold in a second heating cycle at 130° F. on the rotary platform. During the curing process, the contacting edges 67 of the upper and lower walls which are not separated by barrier 69 are bonded together, as shown in FIG. 5. Once the upper wall and the lower wall are bonded together along edges 67, the saddle is inflated by applying air through valve 65. Since barrier 69 has prevented the adhesion of the upper wall to the lower wall except along edges 67, the application of a gas to valve 65 causes the upper and lower walls to separate as shown by the dashed lines, except where bonded, to form a central gas-filled cavity.

Figure 6:
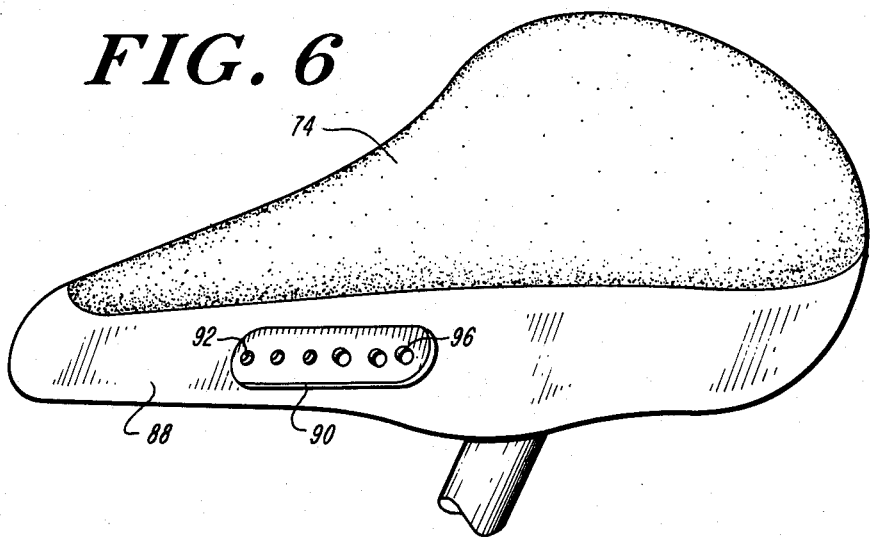
FIG. 6 is a pictorial view of another embodiment of the saddle of this invention.
Figure 7:
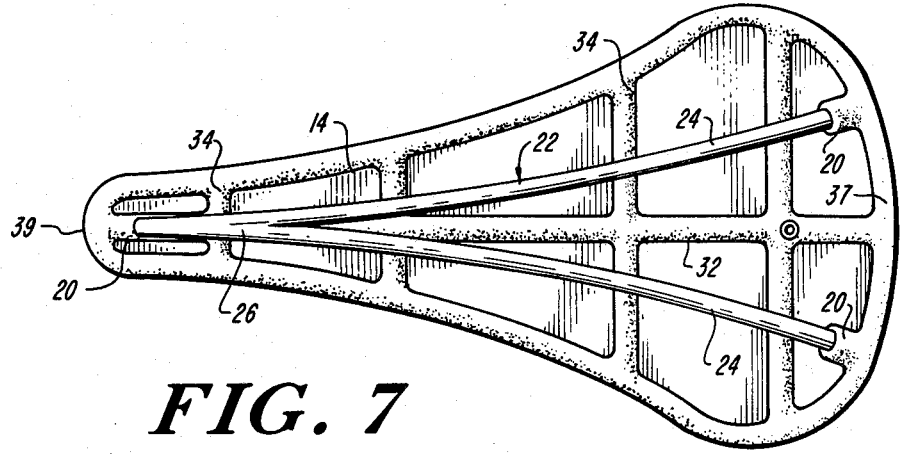
FIG. 7 is a bottom view of the saddle of FIG. 1.

An alternative embodiment of the saddle of this invention formed by the rotocasting process is illustrated by FIGS. 2 and 6. In this embodiment, not only is upper wall 12 provided with a lesser thickness than lower wall 14 to provide greater flexibility, but the thickness of upper wall 12 is varied over its lateral extent to provide greater flexibility and thus greater comfort to the rider in those areas which carry most of the weight of the rider or which contact more delicate or more sensitive portions of the rider's anatomy. More specifically, the forwardly extended tongue 82 of the bicycle seat is formed with a lesser thickness longitudinally along the center thereof to provide a more flexible surface which is softer and which more comfortably accommodates the genitals of the rider. In addition, upper wall 12 is provided with a lesser thickness in areas 74 and 76, as shown in FIG. 1 upon which the tailbone of the rider would normally rest. Each saddle can be customized to suit the individual needs of a particular rider, both in the location of the more flexible regions, and in the degree of comfort provided thereby.

The zones of greater flexibility described above are formed by the application of an additional layer 81 of asbestos or an insulating metal on the exterior of top half 44 of the mold adjacent the desired zones of greater flexibility. The lateral extent of areas 74 and 76 is determined by the lateral extent of layers 81, while the degree of flexibility is a function of the thickness of layers 81. Thus, the location and flexibility of the more comfortable areas can be precisely tailored to suit individual needs. For example, a long strip of asbestos may be applied to the exterior of top half 41 adjacent tongue 82 to render tongue 82 more flexible, and a similar thickness of asbestos having a circular configuration may be applied to the exteriors of the top half 44 adjacent areas 74 and 76 to render areas 74 and 76 more flexible, as shown in FIG. 4.

Another feature of this invention is illustrated in FIG. 6. A pressure gauge 90 may be provided along a surface of saddle 10 to indicate to the rider when the desired degree of comfort has been obtained by the application of gas to valve 18. One typical location for gauge 90 is on side surface 88, as shown in FIG. 6, but gauge 90 may be positioned along any other surface of the saddle, as desired. The greater the gas pressure within saddle 10, the firmer and less comfortable is the ride. In this particular embodiment, gauge 90 is provided with a plurality of pressure sensitive diaphragms 96 which are responsive to a particular gas pressure within saddle 10. As a particular pressure is reached, the particular diaphragm 96 associated with that pressure is forced outwardly through an aperture 92 and that diaphragm 96 is then visible to the rider. As the pressure is increased further, subsequent diaphragms 96 responsive to progressively higher pressures are sequentially forced outwardly, the actual pressure being that associated with the highest pressure diaphragm visible. As the gas pressure is reduced, the diaphragms 96 sequentially retract to be no longer visible. Presumably, the diaphragm associated with each pressure would be provided with a different color which is easily visible through aperture 92. Typically, the gas pressure within saddle 10 is in the range of 15 psi to 50 psi and preferably is in the range of 20 to 40 psi.

The saddle of this invention may be covered with leather or any other desired material which provides additional rider comfort or which provides a desired style. Also, any color pigment may be used in the formation of the saddle to provide the color desired, and the texture of the saddle exterior may be varied to provide the desired comfort. For example, the sides 88 of the saddle where the rider's legs would rub, may be provided with a smooth finish, while an upper textured surface 74 may be provided to prevent the rider from sliding, as shown in FIG. 6.

In view of the above description, it is likely that modifications and improvements will occur to those skilled in the art which are within the scope of this invention which is defined solely in the following claims.

What is claimed is:

1. A pneumatic saddle for vehicles, comprising:
   a completely hollow rider-supporting shell made of a single plastic material in the shape of a bicycle saddle, said shell having a narrow forward portion, a rear portion relatively broader than said forward portion, an upper wall which constitutes the top of said shell, and a lower wall which constitutes the bottom of said shell;
   said shell also including a continuous transitional zone between said upper and said lower walls, connecting them together, the thickness of said transitional zone varying gradually between the thickness of said upper wall and the thickness of said lower wall;
   said shell surrounding and enclosing a chamber, and being provided with a valved aperture extending through said shell into said chamber, for introduction and maintenance of a positive pressure of gas in said chamber;
   said lower wall being about 2 to 4 times as thick as said upper wall and being substantially rigid relative to said upper wall;
   said lower wall possessing at least one longitudinal ridge extending the length of said shell, as well as a plurality of transverse ridges extending from said longitudinal ridge, for reinforcement;
   said lower wall having a thickness of from about 0.1 to about 0.5 inches, and having on its narrow forward portion and broader rear portion a plurality of outwardly-facing sockets adapted to receive and hold supports for said shell;
   said upper wall having a maximum thickness of from about 0.02 to about 0.2 inches and being flexible relative to said lower wall;
   the top of the narrow forward portion of said upper wall and the broad rear portion of said upper wall being thinner than the maximum thickness of said upper wall, for rider comfort; and
   means, associated with the sockets on the lower wall of said shell, for supporting said shell and connecting it to a vehicle.

2. The pneumatic saddle of claim 1 further comprising:
   a pressure gauge built into said shell.

3. A pneumatic saddle for vehicles, comprising:
   a completely hollow rider-supporting shell made of at least two plastic materials formed in the shape of a bicycle saddle, said shell having a narrow forward portion, a rear portion relatively broader than said forward portion, an upper wall which constitutes the top of said shell, and a lower wall which constitutes the bottom of said shell;

said shell also including a continuous transitional zone between said upper and said lower walls, connecting them together;

said shell surrounding and enclosing a chamber, and being provided with a valved aperture extending through said shell into said chamber, for introduction and maintenance of a positive pressure of gas in said chamber;

said lower wall being about as thick as said upper wall and having a flexural modulus higher than the flexural modulus of said upper wall, so that said lower wall is substantially rigid relative to said upper wall;

said lower wall possessing at least one longitudinal ridge extending the length of said shell, as well as a plurality of transverse ridges extending from said longitudinal ridge, for reinforcement;

said lower wall havin a maximum thickness of about 0.5 inches, and having on its narrow forward portion and broader rear portion a plurality of outwardly-facing sockets adapted to receive and hold supports for said shell;

said upper wall having a maximum thickness of about 0.5 inches and having a flexural modulus less than that of said lower wall, so that said upper wall is flexible relative to said lower wall;

the top of the narrow forward portion of said upper wall and the broad rear portion of said upper wall beig thinner than the maximum thickness of said upper wall, for rider comfort; and means, associated with the sockets on the lower wall of said shell, for supporting said shell and connecting it to a vehicle.

4. The pneumatic saddle of claim 3 further comprising:

a pressure gauge built into said shell.

5. The pneumatic saddle of claim 3 wherein the upper and lower walls of the shell are constructed, respectively, of polyurethanes having different flexural moduli.

* * * * *

UNITED STATES PATENT AND TRADEMARK OFFICE
CERTIFICATE OF CORRECTION

PATENT NO. : 4,611,851
DATED : September 16, 1986
INVENTOR(S) : Howard B. Noyes, et al It is certified that error appears in the above-identified patent and that said Letters Patent is hereby corrected as shown below:

ABSTRACT:

Line 9, reads "bicycle of" should read --bicycle seat of--.

Line 9, reads "ina" should read --in a--.

Column 1, line 26, reads "toward," should read --forward,--.

Column 3, line 52, reads "face" should read --force--.

Column 4, line 2, reads "thickness" should read --thicknesses--.

Column 9, line 19, reads "havin" should read --having--.

Column 10, line 9, reads "beig" should read --being--.

Signed and Sealed this

Second Day of February, 1988

Attest:

DONALD J. QUIGG

Attesting Officer

Commissioner of Patents and Trademarks